United States Patent
Ninomiya

(10) Patent No.: US 6,771,318 B1
(45) Date of Patent: Aug. 3, 2004

(54) DIGITAL BROADCASTING DEMODULATION APPARATUS WITH A DIRECTION ADJUSTMENT INDICATOR FOR THE RECEIVING ANTENNA

(75) Inventor: Kunio Ninomiya, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 426 days.

(21) Appl. No.: 09/856,318
(22) PCT Filed: Sep. 21, 2000
(86) PCT No.: PCT/JP00/06463
§ 371 (c)(1), (2), (4) Date: Aug. 1, 2001
(87) PCT Pub. No.: WO01/22602
PCT Pub. Date: Mar. 29, 2001

(30) Foreign Application Priority Data

Sep. 21, 1999 (JP) ............................................ 11-267703

(51) Int. Cl.$^7$ ............................ H04N 5/50; H04N 5/445
(52) U.S. Cl. ...................... 348/570; 348/553; 348/569; 348/725; 348/726; 455/226.4; 455/25; 375/324
(58) Field of Search ................................ 348/570, 569, 348/553, 563, 678, 192, 705, 193, 706, 194, 707, 725, 726, 731, 507; 455/25, 24, 67.11, 67.13, 232.1, 234.1, 250.1, 226.4, 263, 423; 342/359, 358; 714/704, 817, 819; 375/324, 328, 345

(56) References Cited

U.S. PATENT DOCUMENTS

| | | | |
|---|---|---|---|
| 4,214,273 A | * 7/1980 | Brown | ........................ 348/569 |
| 4,935,814 A | * 6/1990 | Omoto et al. | ................ 348/193 |
| 5,175,881 A | * 12/1992 | Mita et al. | ................ 455/234.1 |
| 5,574,509 A | 11/1996 | Citta et al. | |
| 5,712,690 A | * 1/1998 | Kim | ........................... 348/570 |
| 5,797,083 A | 8/1998 | Anderson | |
| 5,898,699 A | 4/1999 | Chiba | |
| 5,940,028 A | 8/1999 | Iwamura | |
| 5,966,186 A | * 10/1999 | Shigihara et al. | ........... 348/570 |
| 5,966,638 A | * 10/1999 | Mita et al. | .................. 455/3.06 |
| 6,104,341 A | * 8/2000 | Mita et al. | ................... 342/359 |
| 6,154,505 A | * 11/2000 | Konishi et al. | ............. 375/321 |
| 6,580,452 B1 | * 6/2003 | Gangitano | .................. 348/180 |

FOREIGN PATENT DOCUMENTS

| | | |
|---|---|---|
| EP | 0687028 A1 | 12/1995 |
| EP | 0818923 A2 | 1/1998 |
| EP | 1014481 A1 | 6/2000 |
| JP | 6-132990 | 5/1994 |
| JP | 6-291694 | 10/1994 |

* cited by examiner

Primary Examiner—Michael H. Lee
Assistant Examiner—Jean W. Désir
(74) Attorney, Agent, or Firm—Wenderoth, Lind & Ponack, L.L.P.

(57) ABSTRACT

A signal of a desired channel is selected by a tuner from digital broadcasting is received by an antenna. The condition of the radio wave received by the antenna, which is judged from an AGC signal of the signal of the channel selected by the tuner, a Sync signal detected by a synchronization establishment unit and the number of errors which have not been corrected by a forward error corrector 10, is displayed on an indicator. The receiving direction or position of the antenna can be easily decided on the basis of the condition of the received radio wave of the antenna, which is displayed on the indicator, so that received video has a C/N within thresholds.

4 Claims, 6 Drawing Sheets

DIGITAL BROADCASTING DEMODULATION APPARATUS WITH A DIRECTION ADJUSTMENT INDICATOR FOR THE RECEIVING ANTENNA

TECHNICAL FIELD

The present invention relates to a digital broadcasting demodulation apparatus which demodulates digital data of digital broadcasting which are received by an antenna.

BACKGROUND ART

In recent television broadcasting, services using satellites or CATV (Cable Television) have been performed with digital compression technology, digital modulation/demodulation technology and the like. Video is coded according to MPEG 2 (Motion Picture Experts Group 2). As a digital modulation scheme, a QPSK (Quadrature Phase Shift Keying) scheme is adopted in satellite broadcasting and a QAM (Quadrature Amplitude Modulation) scheme is adopted in CATV. In the US, the ground wave digital broadcasting (DTV) was started in the Autumn of 1998, and video compression using MPEG 2 is executed and services are performed in a digital modulation 8VSB (Vestigial Side Bands) scheme.

At present, in ordinary households in the US, loop-type or dipole-type simple indoor antennas are generally used in receiving the NTSC (National Television System Committee) analog ground wave broadcasting, and relatively good video can be viewed on television. It is also expected that the digital ground wave broadcasting will be received with the simple indoor antennas in many households. Hereinafter, an example of the digital ground wave broadcasting receiving apparatus is described with reference to the drawings.

FIG. 6 is a block diagram illustrating a structure of a conventional digital broadcasting demodulation apparatus.

The conventional ground digital broadcasting demodulation apparatus 1000 comprises a tuner 302 for selecting a signal of a channel from a RF signal which is received by a loop-type or dipole-type indoor antenna 1, a SAW (Surface Acoustic Wave) filter 303 for subjecting the selected modulated signal to the band limitation, an AMP 304 for amplifying the signal, an orthogonal detector 305 for executing orthogonal detection to the amplified signal using a-mixer, a first low-pass-filter (hereinafter, referred to as LPF) 306, an A/D converter 307 for converting an analog signal into a digital signal, a synchronization establishment unit 308 for reproducing a clock and detecting a Sync signal of packet data, a waveform equalizer 309, a forward error corrector 311, a data output terminal 311, an AGC (Automatic Gain Control) signal detector 312, a second LPF 313, and a Voltage Control Oscillator (hereinafter, referred to as VCO) 321.

The operation of the so-constructed conventional digital broadcasting demodulation apparatus is described.

The broadcasting station compresses coded digital video data and audio data, multiplexes the compressed data with various types of information, converts the data into data in a packet format (hereinafter, referred to as packet data), subjects the packet data to RF modulation, and transmits the data to viewers.

The viewer manually changes the direction of the simple indoor antenna 1 so as to obtain a received power having a good C/N (Carrier to Noise Ratio). The antenna 1 receives the RF demodulated signals and transmits the signals to the tuner 302 of the digital broadcasting modulation apparatus.

The tuner 302 selects a signal of a channel which is selected by the viewer from the RF modulated signals, subjects the selected signal to gain control, and outputs an intermediate frequency (IF) signal.

The SAW filter 303 imposes band limitation on the IF signal which is output by the tuner 302 so as to obtain a predetermined frequency characteristics, and outputs the signal to the AMP 304.

The AMP 304 receives a control signal from the AGC signal detector 312 (which is described later), amplifies the signal which is transmitted by the SAW filter 303, and outputs the amplified signal to the orthogonal detector 305.

The orthogonal detector 305 subjects the signal which is output by the AMP 304 to orthogonal detection, and obtains a baseband signal.

The first LPF 306 removes excess higher harmonic components of the baseband signal. The baseband signal whose higher harmonic components are removed is transmitted to the A/D converter 307 and the AGC signal detector 312.

The AGC signal detector 312 detects an envelope of the baseband signal.

The envelope which is detected by the AGC signal detector 312 is transmitted to the AMP 304 via the second LPF 313 as the AGC signal and the amplitude of the received modulated signal is controlled by the AMP 304. In addition, the AGC signal is supplied by the AMP 304 to the tuner 302 to control the operation of the tuner 302. That is, the AGC signal executes feedback control for both of the tuner 302 and the AMP 304.

On the other hand, the baseband signal which is input to the A/D converter 307 is converted in a digital signal and supplied to the synchronization establishment unit 308.

The synchronization establishment unit 308 extracts a clock reproduction control signal from the baseband signal and outputs the clock reproduction control signal to the VCO 321 while detecting a Sync signal of the packet data and outputting the packet data to the waveform equalizer 309.

The waveform equalizer 309 controls frequency characteristics of the data, removes distortion of the data occurring due to interference such as ghost or multi-path, and outputs the data to the Forward Error Corrector (FEC) 310.

The Forward Error Corrector 310 corrects errors in the packet data which are output from the waveform equalizer 309, and outputs the corrected data to the output terminal 311 as MPEG transport data. The transport data which are output from the output terminal 311 are subjected to decoding processing by a decoder (not shown), and video data are displayed on a predetermined monitor (not shown) and audio data are output from a predetermined audio output unit (not shown).

The VCO 321 feeds back an oscillated frequency signal in accordance with the clock reproduction signal to the A/D converter 307. Here, the signal which is fed back to the A/D converter 307 is generated by a PLL.

However, changes in the image quality of video of the digital ground wave broadcasting are steeper near thresholds of C/N which indicates whether the video display is sufficiently possible or not, as compared with changes in the image quality of video of the analog ground wave broadcasting such as NTSC. That is, in the digital broadcasting, when the C/N is within the thresholds, video having certain image quality can be displayed under all conditions of a received radio wave. However, when the C/N is outside the thresholds even slightly, the video is interrupted or frozen.

When the digital ground wave broadcasting is received using the loop-type or dipole-type simple indoor antenna, the direction of the antenna is changed manually, thereby finding an optimum value of the directivity or receiving sensitivity. At this time, it is required that the received radio wave is displayed on a monitor as video when manually moving the antenna and that the image quality of video on the monitor is judged every time the antenna is moved. However, it is very complicated to manually decide the receiving direction or position of the antenna, and it is difficult to decide the optimum direction and position of the antenna.

DISCLOSURE OF THE INVENTION

To solve the above-mentioned problems, a digital broadcasting demodulation apparatus which demodulates signals of digital broadcasting received by an antenna, comprises a signal demodulation unit for demodulating a signal of a desired channel from the digital broadcasting; and an indication unit for indicating a parameter which is affected by a condition of a radio wave received by the antenna among parameters associated with processing of the signal demodulation unit, to viewers.

According to the digital broadcasting demodulation apparatus of the present invention, even when video is not displayed on a monitor during reception of the broadcasting with a simple indoor antenna or the like, the parameter which is affected by the condition of the radio wave received by the antenna is indicated to the viewers by the indication unit. Therefore, the optimum angle or position of the antenna such that received video has a C/N within the thresholds can be easily found.

In the digital broadcasting demodulation apparatus according to the present invention, the signal demodulation unit comprises a tuner for selecting the signal of the desired channel; an AMP for amplifying the signal selected by the tuner; an orthogonal detector for executing orthogonal detection to the signal amplified by the AMP, to obtain a baseband signal; and an A/D converter for converting the baseband signal into a digital signal; a synchronization establishment unit for detecting a Sync signal from the baseband signal which has been converted into the digital signal, and generating a Sync signal detection flag and a digital processing AGC signal for controlling operations of the AMP and the tuner when the Sync signal is detected. The signal demodulation unit also includes a waveform equalizer for removing a distortion of the signal which is synchronized by the synchronization establishment unit; a forward error corrector for correcting errors in data which is output by the waveform equalizer; an AGC signal detector for detecting an analog processing AGC signal for controlling the operations of the AMP and the tuner from the baseband signal before being converted into the digital signal; and a switch outputting the analog processing AGC signal as an AGC signal until the Sync signal detection flag is detected, and outputting the digital processing AGC signal as the AGC signal when the Sync signal detection flag is detected, and the parameter which is affected by the condition of the radio wave received by the antenna includes at least one of the Sync signal detection flag, the AGC signal, a number of errors which have not been corrected by the forward error corrector, and the error which is detected by the waveform equalizer.

According to the digital broadcasting demodulation apparatus of the present invention, the indication unit is a monitor for indicating a video signal of the digital broadcasting.

According to the digital broadcasting demodulation apparatus of the present invention, even when the video is not displayed on the monitor during the reception of the broadcasting with the simple indoor antenna or the like, the parameter which is affected by the condition of the radio wave received by the antenna is indicated by the monitor to the viewers. Therefore, the optimum angle or position of the antenna such that the received video has a C/N within the thresholds can be easily found.

In the digital broadcasting demodulation apparatus of the present invention, a judgement unit for comparing the parameter which is affected by the condition of a radio wave received by the antenna with a previously set reference, and judging the condition of the radio wave received by the antenna is further included, and the indication unit indicates the condition of the received radio wave which is judged by the judgement unit.

According to the digital broadcasting demodulation apparatus of the present invention, even when the video is not displayed on the monitor during the reception of the broadcasting with the simple indoor antenna or the like, the received radio wave condition which is judged by the judgement unit is displayed to the viewers by the indication unit. Therefore, the optimum angle or position of the antenna such that the received video has a C/N within the thresholds can be easily found.

BEST MODE FOR CARRYING OUT THE INVENTION

Hereinafter, digital broadcasting demodulation apparatuses according to embodiments of the present invention will be described with reference to the attached drawings, taking VSB ground digital broadcasting as an example.

Embodiment 1.

A digital broadcasting demodulation apparatus according to a first embodiment of the present invention comprises a signal demodulation unit for demodulating a signal of a desired channel from digital broadcasting which is received by an antenna and outputting the signal to a decoder, and an indication unit, i.e., an indicator for indicating parameters which are affected by the received radio wave condition of the antenna among parameters associated with the processing of the signal demodulation unit, to a viewer.

As the parameters which are affected by the received radio wave condition of the antenna, a synchronization detection flag which is detected by a signal demodulation unit (described later), an AGC signal and the counted number of packet error flags are employed.

Figure 1:
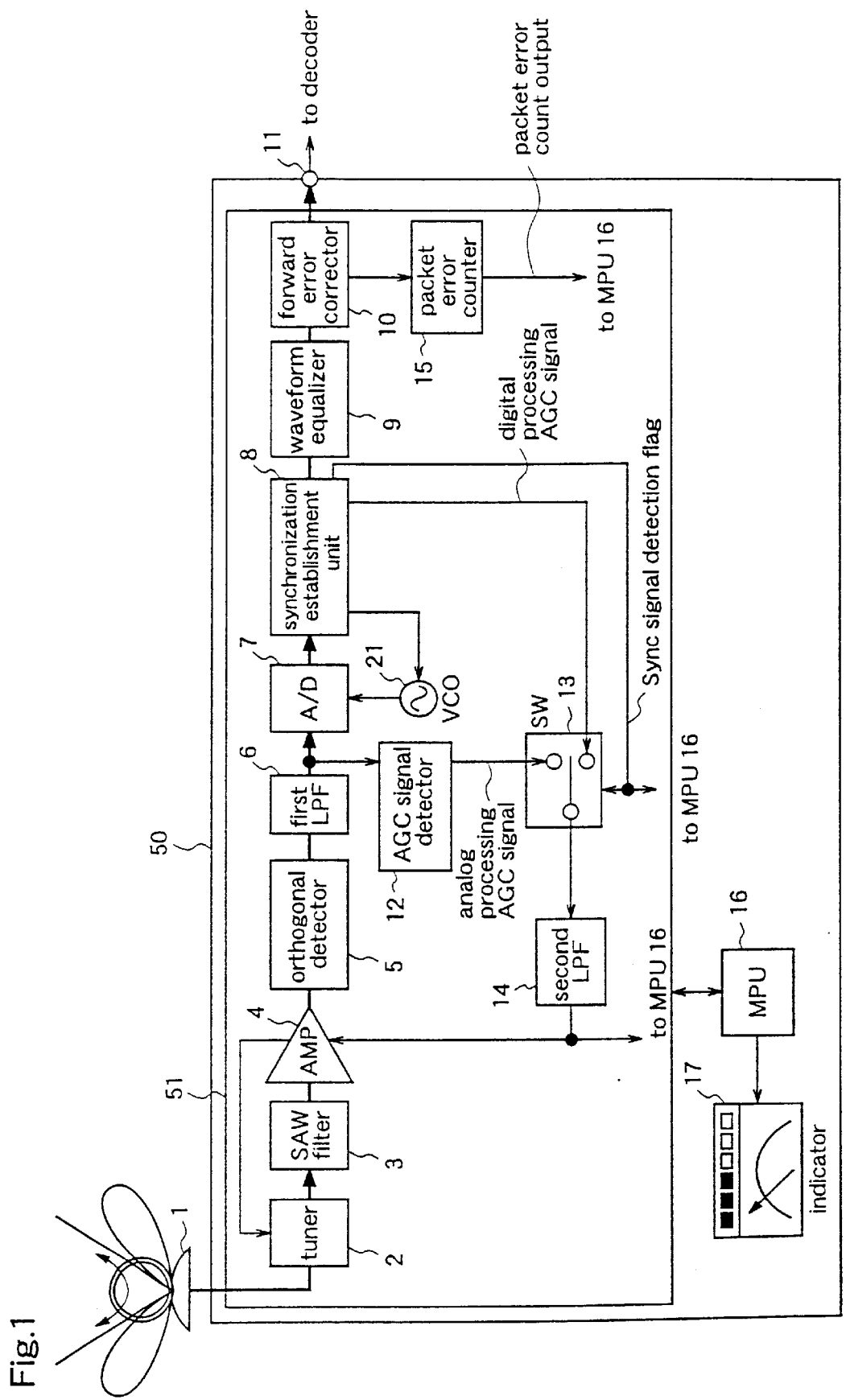
FIG. 1 is a block diagram illustrating a structure of a digital broadcasting demodulation apparatus according to a first embodiment of the present invention.

FIG. 1 is a block diagram illustrating a structure of a digital broadcasting demodulation apparatus 50 according to the first embodiment. Here, in order to simplify the description, the description is given taking the digital ground wave broadcasting VSB modulation scheme as an example.

The digital broadcasting demodulation apparatus 50 comprises a signal demodulation unit 51 for demodulating RF modulated signals of digital broadcasting which are received by a simple indoor antenna (for example, loop-type or dipole-type antenna) 1, an MPU (Micro Processing Unit) 16 and an indicator 17.

The signal demodulation unit 51 comprises a tuner 2 for selecting a signal of a channel from the RF modulated signals which are received by the antenna 1, a SAW filter 3 for subjecting the selected modulated signal to band limitation, an AMP 4 for amplifying the signal, an orthogonal detector 5 for executing orthogonal detection using a mixer, a first LPF 6, an A/D converter 7 for converting an analog signal to a digital signal, a synchronization establishment unit 8, a waveform equalizer 9, a Forward Error Corrector 10, an output terminal 11 for outputting data to a decoder (not shown), an AGC signal detector 12, a switch 13, a second LPF 14, a packet error counter 15 for counting the number of errors in each packet, and a VCO 21.

The operation of the so-constructed digital broadcasting demodulation apparatus 50 is described.

The tuner 2 selects a signal of a specific channel which is selected by the viewer from signals of plural channels included in the RF modulated signals, adjusts gain of the selected signal in accordance with an AGC signal (described later), and outputs an intermediate frequency (IF) signal.

The SAW filter 3 imposes the band limitation to predetermined frequency characteristics of the IF signal which is output by the tuner 2 and outputs the signal to the AMP 4.

The AMP 4 amplifies the signal in accordance with the AGC signal and outputs the signal to the orthogonal detector 5.

The orthogonal detector 5 executes the orthogonal detection to the signal which is output by the AMP 4 and obtains a baseband signal. The structure of the orthogonal detector 5 is described later.

The first LPF 6 removes excess higher harmonic components of the baseband signal.

The baseband signal whose higher harmonic components are removed is transmitted to the A/D converter 7 and the AGC signal detector 12.

The baseband signal which is input to the A/D converter 7 is converted into a digital signal and supplied to the synchronization establishment unit 8.

The synchronization establishment unit 8 extracts a clock reproduction control signal from the baseband signal and outputs the clock reproduction control signal to the VCO 21 while outputting a synchronization detection flag to the switch 13 and the MPU 16 when detecting a Sync signal of packet data, outputs a digital processing AGC signal which is constituted by a known level of the Sync signal to the switch 13, and outputs data in which the Sync signal is detected to the waveform equalizer 9.

The waveform equalizer 9 controls the frequency characteristics of the data, removes the distortion of the data due to the interference such as ghost or multi-path, and outputs the data to the Forward Error Corrector (FEC) 10.

The Forward Error Corrector 10 corrects errors in the packet data which are output from the waveform equalizer 9, outputs a packet error flag to a packet error counter 15 for a packet which cannot have been corrected, and outputs data whose errors have been corrected to the output terminal 11 as MPEG transport data. The data which are output by the Forward Error Corrector 10 are decoded by a MPEG decoder (not shown) and output to a reproduction means for reproducing the digital broadcasting, for example, a monitor (not shown) for reproducing video data or a speaker for reproducing audio signals.

The AGC signal detector 12 detects an envelope of the analog baseband signal, and outputs the detected signal to the switch 13 as an analog processing AGC signal.

The switch 13 outputs the analog processing AGC signal or the digital processing AGC signal as the AGC signal in accordance with the Sync signal detection flag.

The signal output by the switch 13 is transmitted to the AMP 4 and the MPU 16 via the second LPF 14.

The AGC signal controls the amplitude of the received modulated signal in the AMP 4. In addition, the AGC signal is supplied to the tuner 2 from the AMP 4, and controls the operation of the tuner 2.

That is, the AGC signal executes the feedback operation for both of the tuner 2 and the AMP 4.

The packet error counter 15 counts the number of packet error flags, and outputs the counted number to the MPU 16.

The VCO 21 feeds back an oscillated frequency signal on the basis of a clock reproduction signal to the A/D converter 7. Here, the signal which is fed back to the A/D converter 7 is generated by a PLL.

The MPU 16 controls the whole operation of the signal demodulation unit 51. The MPU 16 receives the Sync signal detection flag from the synchronization establishment unit 8, receives the AGC signal from the second LPF 14, and receives the number of packet error flags from the packet error counter 15. Here, the number of packet error flags indicates the number of packet data which cannot have been corrected by the Forward Error Corrector 10. The Sync signal detection flag indicates whether the Sync signal of the packet data has been detected or not. Therefore, both of the signals are the parameters for estimating the condition of the radio wave received by the antenna 1. In addition, the AGC signal is a signal for controlling the amplitude level of the received radio wave and thus this signal is a parameter indicating the power of the radio wave received by the antenna 1. Therefore, when the parameters of the counted number of packet error flags, the Sync signal detection flag and the AGC signal are displayed on the indicator 17, the viewer can easily recognize the condition of the radio wave received by the antenna 1.

In addition, when references for parameters indicating the processing condition in the signal demodulation unit 51 are previously set, the MPU 16 can operate as a judgement unit for comparing the actual values of the parameters with the references and judging the received radio wave condition of the signal received by the antenna 1, for example the level of the C/N of the radio wave. At this time, the indicator 17 indicates the received radio wave condition which is judged by the MPU 16.

Figure 2:
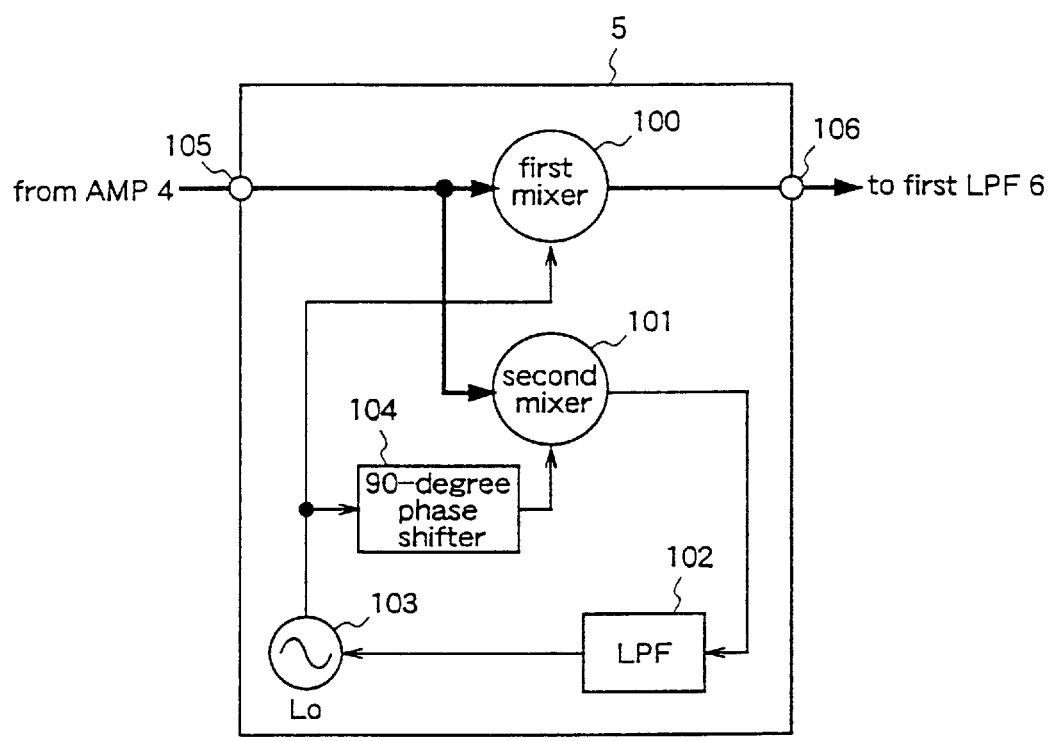
FIG. 2 is a block diagram illustrating a structure of an orthogonal detector.

FIG. 2 is a block diagram illustrating a structure of the orthogonal detector 5.

The orthogonal detector 5 comprises a first mixer 100 for multiplying the IF modulated signal which is output by the AMP 4 and an IF signal which is output by a local signal oscillator (Lo) 103 (described later) together, a second mixer 101 for multiplying the IF modulated signal which is output by the AMP 4 and an output signal of a 90-degree phase shifter 104 (described later) together, a LPF 102 for removing high-band components of the output of the second mixer 101, an Lo 103 which oscillates a local signal from the output of the LPF 102, the 90-degree phase shifter 104 for shifting the phase of the output of the Lo 103 by 90 degrees, an input terminal 105 for receiving the signal from the AMP 4, and an output terminal 106 for outputting a signal which is multiplied by the first mixer 100 as a baseband signal.

The second mixer 101 multiplies the IF modulated signal from the AMP 4 and the local signal whose phase is shifted by 90 degrees together, and outputs error components of the obtained signal from a carrier (pilot signal in the case of the VSB digital ground wave broadcasting) frequency. The error components which are output by the second mixer 101 are subjected to the frequency limitation by the LPF 102 and output by the Lo 103 as the local signal to the first mixer 100 and the 90-degree phase shifter 104.

The operation of oscillating the local signal by the Lo 103 is under feedback control by the second mixer 101, the LPF 102 and the 90-degree phase shifter 104. Therefore, the Lo 103 can generate the local signal which is in phase with the carrier of the IF modulated signal. Accordingly, the orthogonal detection can be executed correctly.

As described above, according to the first embodiment, the angle or position of the simple indoor antenna can be changed by referring to the received radio wave condition of the antenna, which is displayed on the indicator 17. Thereby, the reception power having a good C/N can be easily obtained. Further, the reception condition of the antenna can be judged objectively using the Sync signal detection flag, the counted number of packet errors and the AGC signal, not judging the condition from the video which is displayed on the monitor as in the prior art.

Embodiment 2.

A digital broadcasting demodulation apparatus according to a second embodiment of the present invention can judge the received radio wave condition of the signal which is received by the antenna, on the basis of the Sync signal detection flag, the AGC signal and an error which is detected by the waveform equalizer.

Figure 3:
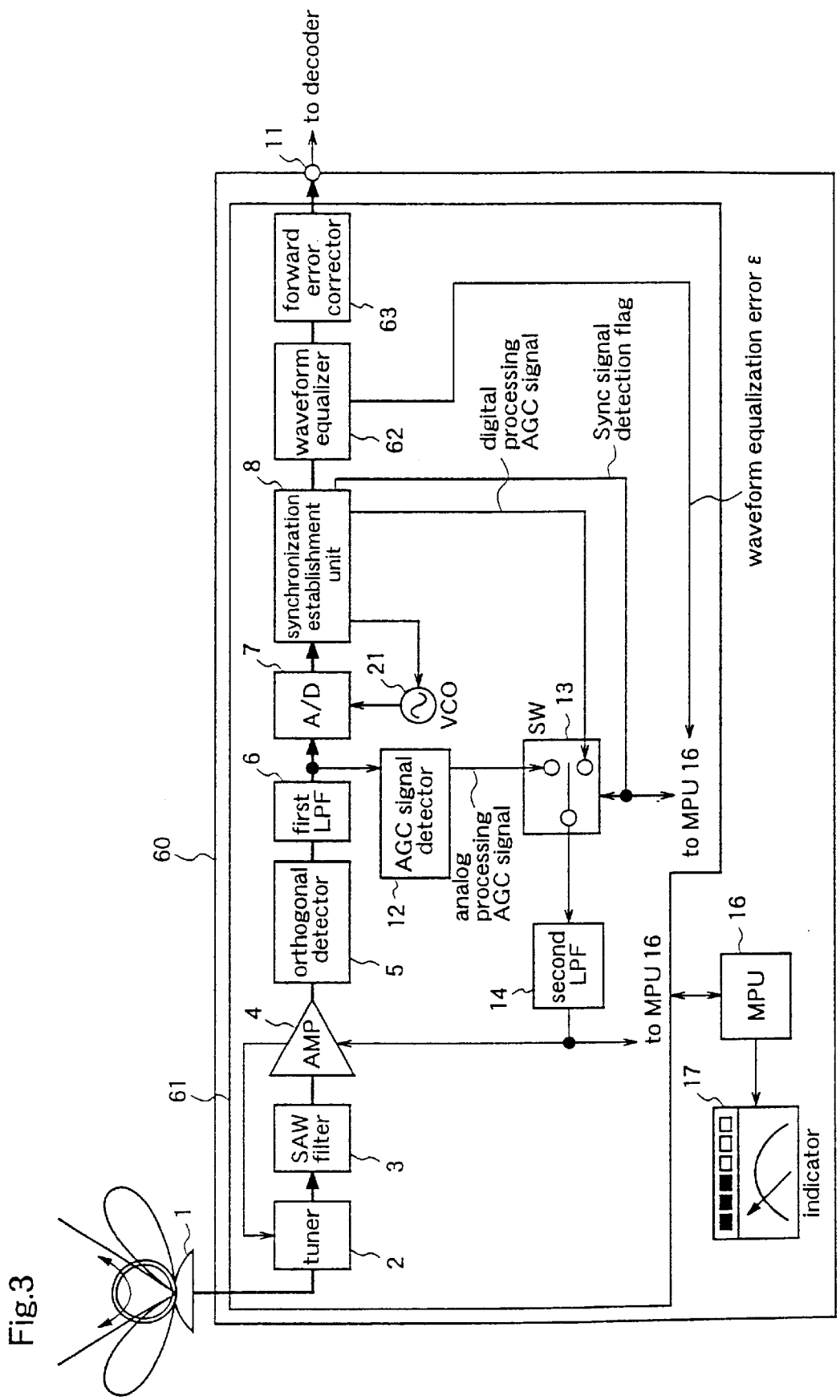
FIG. 3 is a block diagram illustrating a structure of a digital broadcasting demodulation apparatus according to a second embodiment of the present invention.

FIG. 3 is a block diagram illustrating a structure of a digital broadcasting demodulation apparatus 60 according to the second embodiment. The same reference numerals as those in the digital broadcasting demodulation apparatus 50 of the first embodiment denote the same or corresponding parts. The descriptions of these parts are not given here.

The digital broadcasting demodulation apparatus 60 comprises a signal demodulation unit 61 for demodulating RF modulated signals of digital broadcasting which are received by a simple indoor antenna (for example, loop-type or dipole-type antenna) 1, a MPU (Micro Processing Unit) 16, and an indicator 17.

The signal demodulation unit 61 comprises a tuner 2 for selecting a signal of a channel from the RF modulated signals which are received by the simple indoor antenna 1, a SAW filter 3 for subjecting the selected modulated signal to the band limitation, an AMP 4 for amplifier the signal, an orthogonal detector 5 using a mixer, a first LPF 6, an A/D converter 7 for converting an analog signal into a digital signal, a synchronization establishment unit 8, a waveform equalizer 62, a Forward Error Corrector 63 for correcting errors in packet data which are output from the waveform equalizer 62, a data output terminal 11 for outputting data which are output from the Forward Error Corrector 63 as MPEG transport data, an AGC signal detector 12, a second LPF 14, a switch 13, and a VCO 21.

Figure 4:
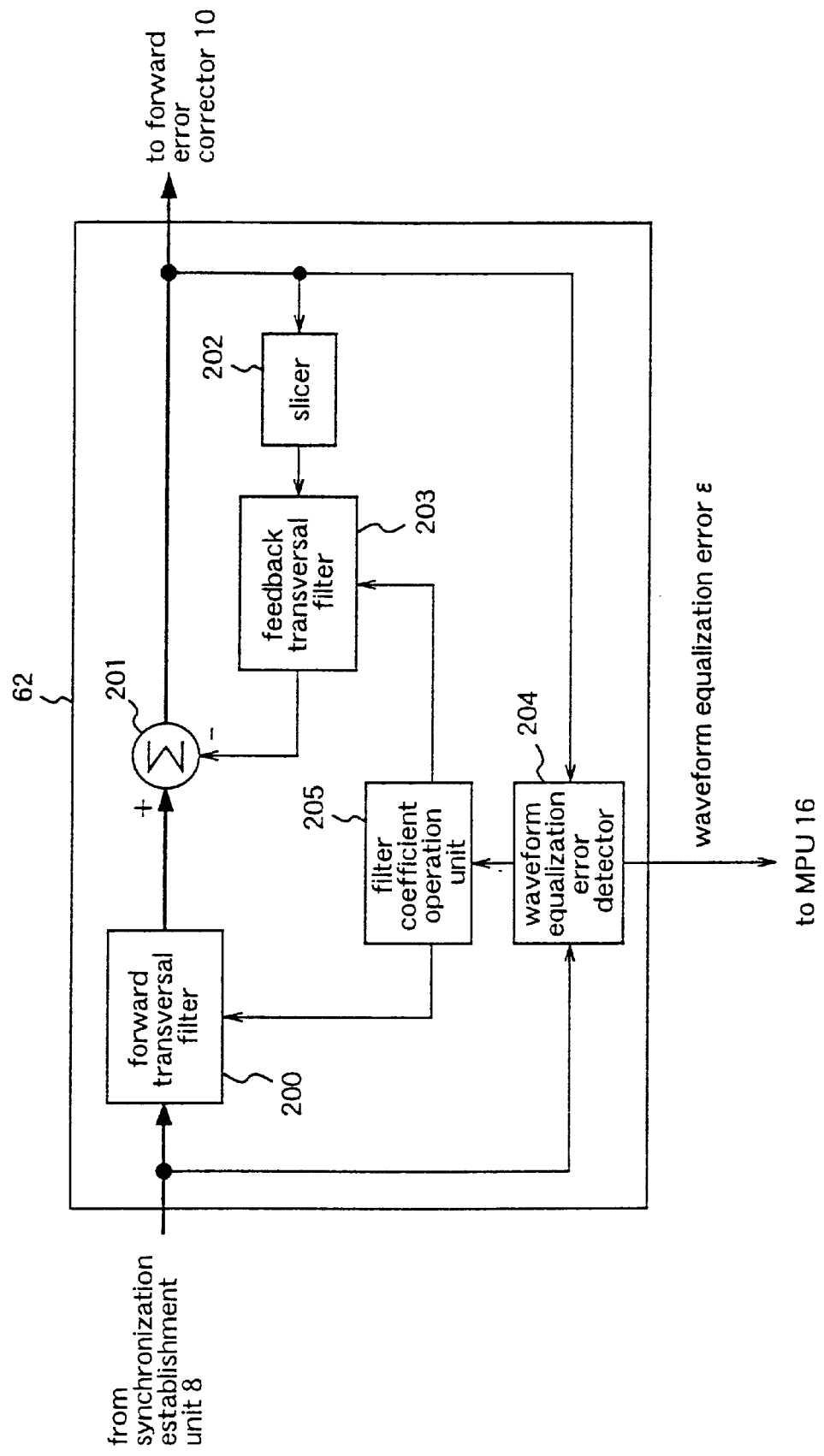
FIG. 4 is a block diagram illustrating a structure of a waveform equalizer.

FIG. 4 is a block diagram illustrating a structure of the waveform equalizer 62.

The waveform equalizer 62 comprises a forward transversal filter (hereinafter, referred to as forward filter) 200, an adder 201, a slicer 202 for judging a value of data, a feedback transversal filter (hereinafter, referred to as feedback filter) 203, a filter coefficient operation unit 205 for calculating coefficients of each of the filters from an error which is detected by an error detector 204 (described later), and the error detector 204 for detecting a waveform equalization error $\epsilon$.

The description is given of the so-constructed waveform equalizer 62.

The data which are output by the synchronization establishment unit 8 are input to the forward filter 200 to be subjected to frequency control, and then output to the adder 201.

The adder 201 subtracts the output data of the feedback filter 203 from the output data of the forward filter 200, then outputs the obtained result to the slicer 202, and further outputs the result to the Forward Error Corrector 10 as the output data of the waveform equalizer 62.

The slicer 202 compares the data value of the input data with an arbitrary reference value to obtain a signal of a predetermined level, and outputs the signal to the feedback filter 203.

The feedback filter 203 executes the frequency control for the input signal, and outputs the signal to the adder 201.

Therefore, the signal output from the adder 201 makes a round of the slicer 202 and the feedback filter 203, and the frequency control for the output signal of the forward filter 200 is executed in the adder 201.

On the other hand, the error detector 204 correlates the output data of the adder 201 and the input data of the waveform equalizer 62 to each other, and detects the waveform equalization error $\epsilon$. The detected error $\epsilon$ is output to the filter coefficient operation unit 205 and the MPU 16.

The filter coefficient operation unit 205 calculates the coefficients of the forward filter 200 and the feedback filter 203 from the error $\epsilon$, and updates the coefficients of the filters.

The MPU 16 receives the Sync signal detection flag from the synchronization establishment unit 8, receives the AGC signal from the second LPF 14, and receives the waveform equalization error $\epsilon$ from the waveform equalizer 62. Here, the Sync signal detection flag indicates whether the Sync signal of the packet data has been detected or not. Accordingly, this flag is used as an index for showing the condition of the radio wave which is received by the antenna. The AGC signal is a signal for controlling the amplitude level of the received radio wave. Accordingly, the AGC signal is used as an index for showing the power of the received radio wave. In addition, when the received radio wave is affected by ghost, multi-path or the like, the waveform equalization error $\epsilon$ grows larger. On the other hand, when the received radio wave is not affected by the interference or the like and the reception condition is good, the error $\epsilon$ grows smaller. Therefore, the condition of the radio wave received by the antenna can be recognized from the Sync signal detection flag, the AGC signal and the waveform equalization error $\epsilon$. Accordingly, when the above parameters are displayed on the indicator 17, the viewer can be easily informed of the received wave condition of the antenna 1.

Here, similar to the first embodiment, it is also possible that the MPU 16 compares the values of the actually detected parameters with the previously set references to judge the received radio wave condition of the antenna 1, and the indicator 17 indicates the judgement result.

As described above, according to the second embodiment, the viewer can change the angle or position of the simple indoor antenna by referring to the received radio wave condition of the antenna, which is displayed on the indicator 17. Therefore, the reception power having a good C/N can be easily obtained. In addition, the reception condition of the antenna can be objectively judged using the Sync signal detection flag, the AGC signal and the waveform equalization error $\epsilon$, not using the video which is displayed on the monitor as in the prior art.

Embodiment 3.

While in the digital broadcasting demodulation apparatus according to the first and second embodiments the condition of the received radio wave of the antenna is displayed on the indicator 17, a digital broadcasting demodulation apparatus according to a third embodiment is further provided with an OSD signal generation circuit to display the received radio wave condition of the antenna on a monitor which is a means for displaying video data of the digital broadcasting.

Figure 5:
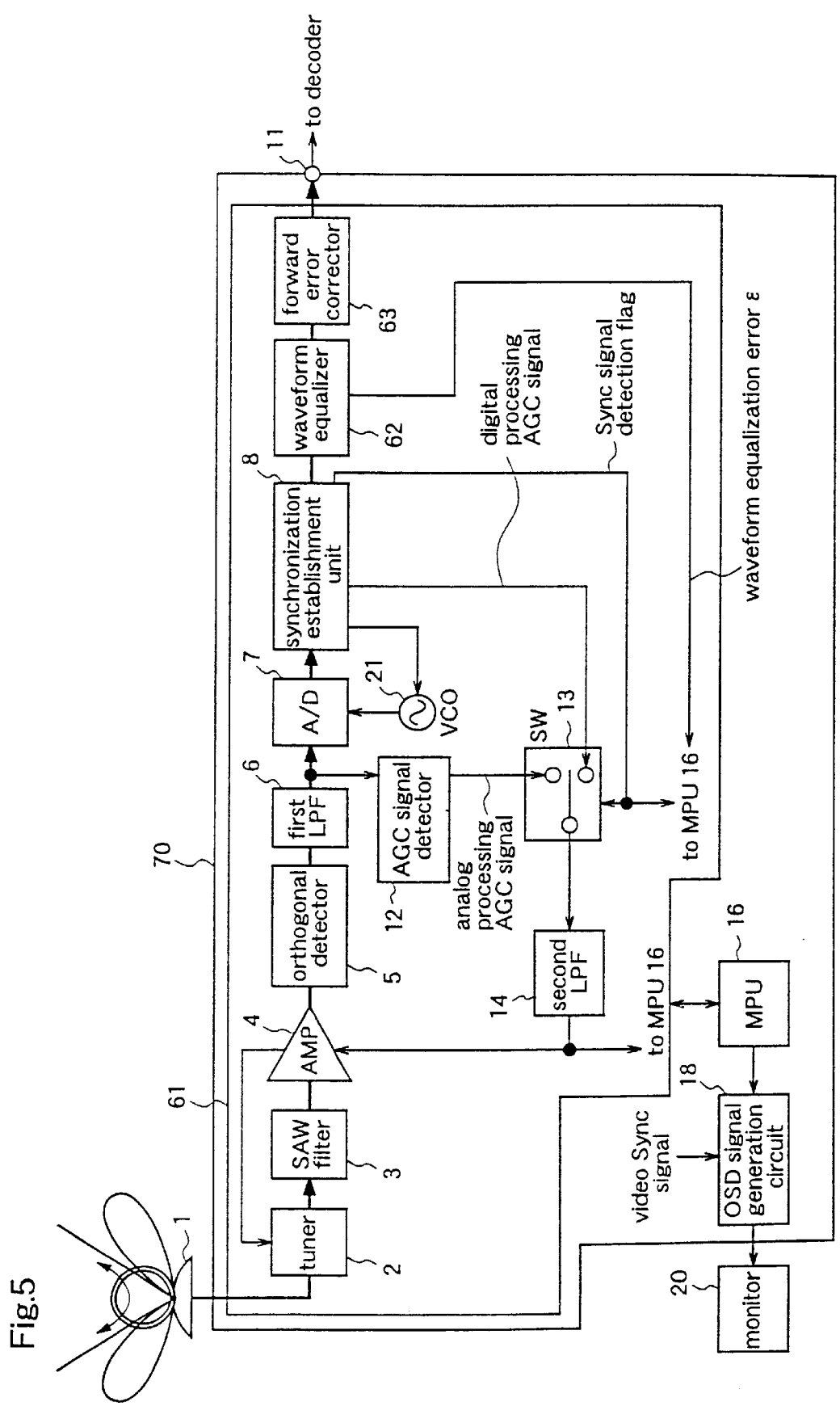
FIG. 5 is a block diagram illustrating a structure CL a digital broadcasting demodulation apparatus according to a third embodiment of the present invention.
Figure 6:
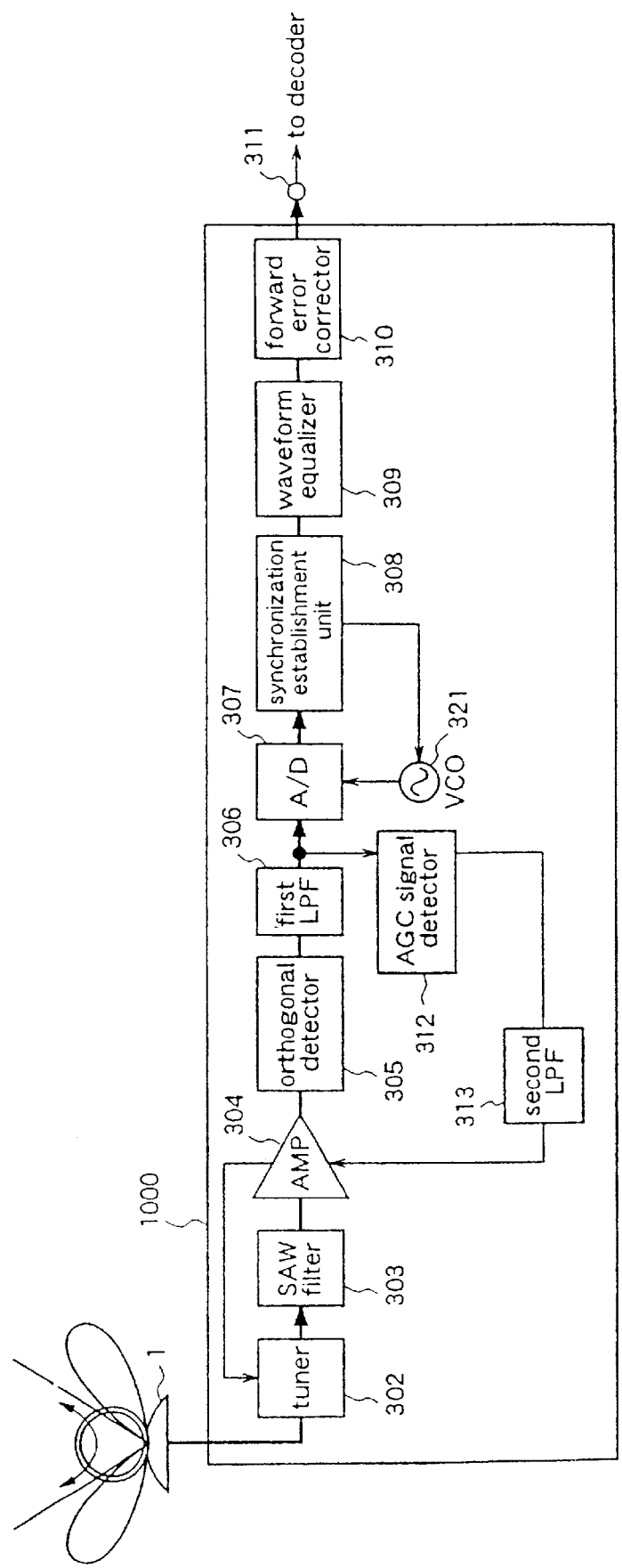
FIG. 6 is a block diagram illustrating a structure of a conventional ground digital broadcasting demodulation apparatus.

FIG. 5 is a block diagram illustrating a structure of a digital broadcasting demodulation apparatus 70 according to the third embodiment. The same reference numerals as those of the digital broadcasting demodulation apparatus 50 according to the first embodiment and the digital broadcasting demodulation apparatus 60 according to the second embodiment denote the same or corresponding parts, and the descriptions thereof are not given here. In the digital broadcasting demodulation apparatus 70 as shown in FIG. 5, the Sync signal detection flag, the AGC signal and the waveform equalization error $\epsilon$ are used as the parameters for judging the received radio wave condition of the antenna as in the second embodiment. However, as in the first embodiment, the Sync signal detection flag, the counted number of packet errors and the AGC signal can be used.

Hereinafter, the operation of the digital broadcasting demodulation apparatus is described with reference to the drawings.

According to the digital broadcasting demodulation apparatus 70 as shown in FIG. 5, a digital broadcasting monitor 20 has the function of the indicator 17 of the digital broadcasting demodulation apparatus 60 according to the second embodiment as shown in FIG. 3, and the digital broadcasting demodulation apparatus further comprises an OSD (On Screen Display) signal generation circuit 18.

The MPU 16 outputs the packet Sync signal detection flag, the AGC signal and the waveform equalization error $\epsilon$ to the OSD signal generation circuit 18 as in the second embodiment. Alternatively the MPU 16 judges the condition of the radio wave received by the antenna 1 on the basis of the packet Sync signal detection flag, the AGC signal and the waveform equalization error $\epsilon$, and outputs the judgement result to the OSD signal generation circuit 18.

The OSD signal generation circuit 18 generates an image for informing the viewer of the condition of the received radio wave. At this time, the OSD signal generation circuit 18 composes the Sync signal of video data which are detected by the synchronization establishment unit 8 with an image to be displayed on the monitor 20, and outputs a composed image to the monitor 20. For example, the OSD signal generation circuit 18 can generate an image for displaying the values of the parameters which are received by the MPU 16. In addition, it is also possible that the MPU 16 compares the parameters with previously set references to calculate a level value of the C/N, and the OSD signal generation circuit 18 generates an image for showing the level value of the C/N. Here, whether the received radio wave condition is to be displayed on the monitor 20 or not can be selected by the viewer.

As described above, the condition of the received radio wave is displayed on the monitor 20 in parallel with video data, without using a decoded signal of the video data, whereby the viewer can be easily informed of the received radio wave condition of the antenna. Further, even when the received radio wave condition of the antenna is too bad to decode data of the digital broadcasting, the received radio wave condition can be displayed on the monitor 20. Therefore, the viewer can easily find a point where the received radio wave condition is the best, by changing the angle or position of the antenna 1, on the basis of the received radio wave condition which is displayed on the monitor 20.

In the first to third embodiments, the combination of the Sync signal detection flag, the counted number of the packet errors and the AGC signal, or the packet Sync signal detection flag, the AGC signal and the waveform equalization error $\epsilon$ is used as the reference for the MPU 16 to judge the condition of the radio wave received by the antenna 1. However, at least one of the Sync signal detection flag, the counted number of the packet errors, the AGC signal and the waveform equalization error $\epsilon$ can be selected as the judgement reference. In addition, signals other than the above signals, which are detected in the signal demodulation unit 51 or 61 and affected by the reception condition of the antenna 1, can be used as the judgement references.

Further, in the first to third embodiments, the descriptions are given taking the digital ground wave broadcasting VSB modulation scheme as the example. However, the scheme of the digital broadcasting is not restricted to the digital ground wave broadcasting VSB modulation scheme.

The digital broadcasting demodulation apparatus according to the present invention comprises a signal demodulation unit for demodulating a signal of a desired channel from digital broadcasting, and an indication unit for indicating to viewers parameters which are affected by the condition of the radio wave received by the antenna among parameters associated with processing of the signal demodulation unit. Thereby, when the ground digital broadcasting is received using a simple indoor antenna or the like, the optimal angle or position of the antenna can be easily found objectively by referring to the received radio wave condition of the antenna which is displayed on the indication unit, without displaying video on the monitor. Accordingly, it is useful particularly when the optimal value of the directivity or reception sensitivity of the antenna is to be found by manually changing the direction of the antenna.

What is claimed is:

1. A digital broadcasting demodulation apparatus which demodulates signals of digital broadcasting received by an antenna, comprising:

a signal demodulation unit operable to demodulate a signal of a desired channel from the digital broadcasting; and an indication unit operable to display a parameter which is affected by a condition of a radio wave received by the antenna among parameters associated with processing of the signal demodulation unit, to viewers, wherein said signal demodulation unit comprises:

a tuner operable to select the signal of the desired channel;

an AMP operable to amplify the signal selected by the tuner;

an orthogonal detector operable to execute orthogonal detection to the signal amplified by the AMP, to obtain a baseband signal;

an A/D converter operable to convert the baseband signal into a digital signal;

a synchronization establishment unit operable to detect a Sync signal from the baseband signal which has been converted into the digital signal, and generate a Sync signal detection flag and a digital processing AGC signal for controlling operations of the AMP and the tuner when the Sync signal is detected;

a waveform equalizer operable to remove a distortion of data which is synchronized by the synchronization establishment unit;

a forward error corrector operable to correct errors in data which are output by the waveform equalizer;

an AGC signal detector operable to detect an analog processing AGC signal for controlling the operations of the AMP and the tuner from the baseband signal before being converted into the digital signal; and a switch operable to output the analogs processing AGC signal as an AGC signal until the Sync signal detection flag is detected, and output the digital processing AGC signal as the AGC signal when the Sync signal detection flag is detected, wherein the parameter which is affected by the condition of the radio wave received by the antenna includes at least one of the Sync signal detection flag, the AGC signal, a number of errors which have not been corrected by the forward error corrector, and an error which is detected by the waveform equalizer.

2. The digital broadcasting demodulation apparatus of claim 1 wherein the indication unit is a monitor operable to display a video signal of the digital broadcasting.

3. The digital broadcasting demodulation apparatus of claim 1, further comprising:

a judgement unit operable to compare the parameter which is affected by the condition of the radio wave received by the antenna with a previously set reference, and judge the condition of the radio wave received by the antenna, wherein the indication unit indicates the condition of the received radio wave which is judged by the judgement unit.

4. The digital broadcasting demodulation apparatus of claim 2, further comprising:

a judgement unit operable to compare the parameter which is affected by the condition of the radio wave received by the antenna with a previously set reference, and judge the condition of the radio wave received by the antenna, wherein the indication unit indicates the condition of the received radio wave which is judged by the judgement unit.

* * * * *